United States Patent [19]
Morley et al.

[11] 3,751,697
[45] Aug. 7, 1973

[54] SYNCHRONOUS MOTOR CONSTRUCTION WITH DIRECTIONAL CONTROL

[75] Inventors: Edwin R. Morley; Roger E. Jacobs, both of Two Rivers, Wis.

[73] Assignee: AMF Incorporated, White Plains, N.Y.

[22] Filed: June 1, 1972

[21] Appl. No.: 258,611

[52] U.S. Cl.................... 310/41, 310/163, 310/257
[51] Int. Cl..................... H02k 7/118, H02k 21/08
[58] Field of Search ............................... 310/41–43, 162–164, 257, 258

[56] References Cited
UNITED STATES PATENTS

| | | | |
|---|---|---|---|
| 3,428,841 | 2/1969 | Bossard et al. | 310/164 |
| 2,981,855 | 4/1961 | Lieshout et al. | 310/163 |
| 3,558,940 | 1/1971 | Chestnut et al. | 310/257 |

*Primary Examiner*—J. D. Miller
*Assistant Examiner*—Robert J. Hickey
*Attorney*—George W. Price et al.

[57] ABSTRACT

Means for assembling and aligning the stator assembly with two pole pieces of a synchronous permanent magnet motor without the use of jigs. The alignment means also provides a pivot for a cam follower for the one way directional control of the motor.

6 Claims, 7 Drawing Figures

3,751,697

SYNCHRONOUS MOTOR CONSTRUCTION WITH DIRECTIONAL CONTROL

This invention relates generally to synchronous permanent magnet A.C. motors and more particularly to means for assembling a stator with two pole pieces therefore.

Heretofore jigs were required for aligning pole pieces when assembling a motor stator, and after alignment the pole pieces were locked together against relative movement. In many instances, misalignment resulted at this time. Inclusion of a directional control or a one way device further complicated the assembly of a motor stator. Accordingly, directional controls have been provided in the gear boxes of many motors. This can cause excessive gear wear which results in noisy motors and also shortens motor life.

Accordingly, an object of the present invention is to provide a motor stator with interfitting parts which can be assembled without the use of a jig.

Another object of the present invention is to provide the foregoing stator which includes a pivot for the oscillating arm of a one way directional control.

And another object of the present invention is to provide the foregoing stator in which the pole pieces are connected together by a core of magnetic material.

And still another object of the present invention is to provide a motor stator with interfitting parts and a pivot for the oscillating arm of a one way directional control which are locked together by connection of the motor case and gear box cover.

The foregoing and other objects and advantages of the invention will appear more fully hereinafter from a consideration of the detailed description which follows, taken together with the accompanying drawings wherein several embodiments of the invention are illustrated by way of example. It is to be expressly understood however, that the drawings are for illustration purposes only and are not to be construed as defining the limits of the invention.

FIG. 1 is a vertical section through a motor, with the gear train removed, made in accordance with the present invention.

FIGS. 2 and 3 are sectional views taken on lines 2—2 and 3—3, respectively, of FIG. 1.

Figure 1:
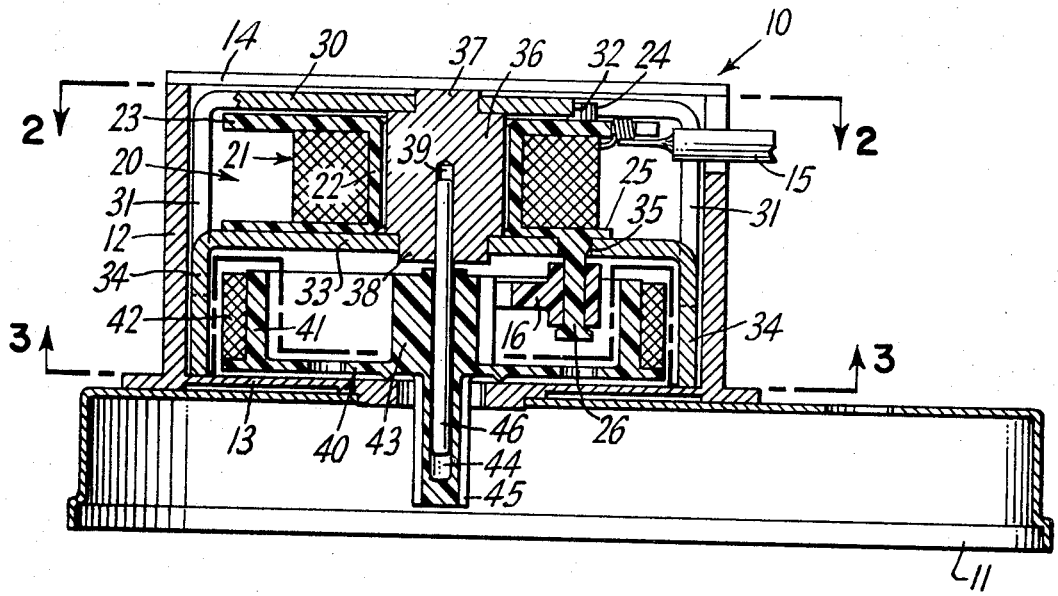

As will be noted the present invention is equally adapted for motors which have rotors fixed on rotating shafts or rotors rotatable on fixed shafts. Although the motors illustrated in the drawings are provided with permanent magnet rotors which are encircled by a series of salient stator poles, its present invention could be embodied equally as well in a motor having a rotor cup with the permanent magnet of the rotor encircling the salient stator poles.

Figure 2:
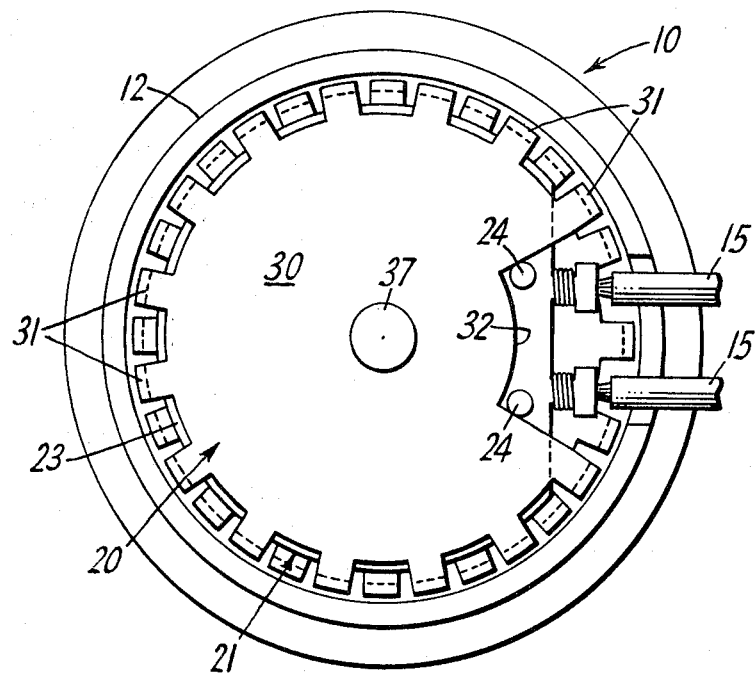
Figure 3:
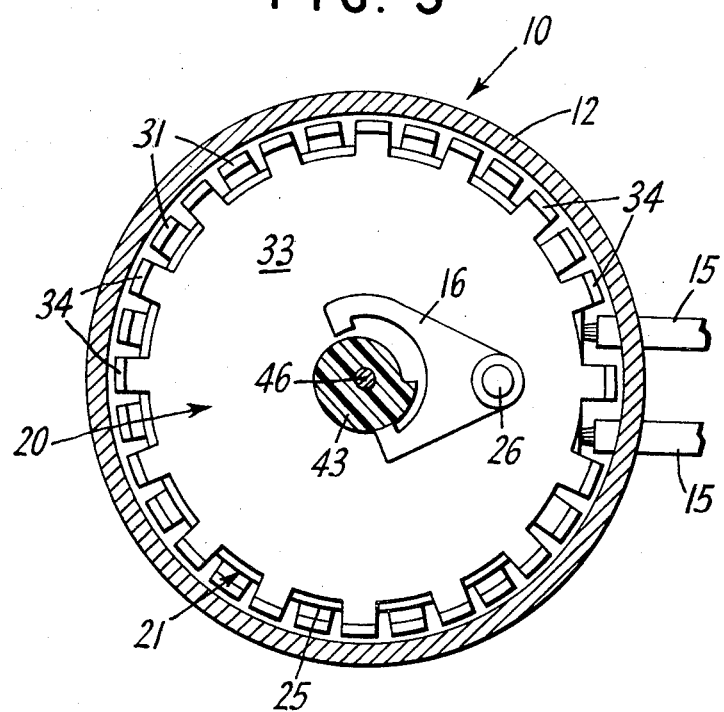

Referring now to the drawings and particularly to FIGS. 1 to 3, a motor 10 in accordance with the present invention is provided with a gear box 11 connected to the front end of a motor case 12. The motor case 12 has a front wall 13 and is open at its back end which is closed by a cover 14 after the motor is assembled.

The stator 20 of the motor 10 includes a coil 21 wound on a bobbin or spool having a tubular body 22 and a pair of spaced flanges 23 and 25 each extending radially outwardly from a different end of the tubular body 22. The ends of the coil 21 are connected to a pair of leads 15 which extend through the motor case 12. The outer surface of the flange 23 is provided with a pair of spaced protrusions or abutments 24 while a pivot 26 extends axially from the flange 25 in a direction away from the flange 23. Preferably, the abutments 24 and pivot 26 are integral with the flanges 23 and 25, respectively.

The stator 20 also includes a pair of pole pieces 30 and 33 disposed against the outer surfaces of the bobbin flanges 23 and 25, respectively, and a core member 36 of magnetic material disposed in the tubular body portion 22 of the bobbin. The core or core member 36 has reduced ends 37 and 38 which extend into and are connected to central openings in the pole pieces 30 and 33, respectively, by any means well known in the art such as staking or being a press fit. The core 36 is also provided with a blind axial bore 39 open at the reduced end 38.

The pole piece 30 is provided with a peripheral series of spaced salient stator poles 31 which extend across the coil 21 towards the front wall 13 of the motor case 12, and a wedge shaped cutout 32 the sides of which engage the abutments 24 to prevent relative rotation between the bobbin or spool and the pole piece 30. The pole piece 33 is provided with a peripheral series of spaced salient rotor poles 34 which extend in the same direction as the poles 31, and an opening 35 through which the pivot 26 extends and prevents relative rotation between the bobbin and the pole piece 33. The bobbin with its protrusions 24 and pivot 26 engaging the pole pieces 30 and 33, respectively, keep the pole pieces from rotating relative to one another and thereby retain their relative alignment with the salient poles of one pole piece disposed in the spaces between the salient poles of the other pole piece. Accordingly, the salient stator poles 31 and 34 alternately form an annular ring of salient stator poles on the one side of the coil 21 closer to the front wall 13 of the motor case 12.

An arm 16 of a one way directional control is mounted on the pivot 26 and a rotor shaft 46 with one end disposed on the blind bore 39 extends axially from the core 36 and into an axial bore 44 of a rotor 40. The rotor 40 is of a cup shape having a permanent magnet 42 mounted on its flange 41 and encircled by the salient stator poles 31 and 34. The permanent magnet 42 is divided into a plurality of alternate North-South pole areas while the salient stator poles 31 are all of the same polarity and instantaneously opposite from the polarity of the poles 34 which is common to this type of motor. The rotor 40 is provided with a central cam or cam shaped hub 43 which cooperates with the pivotal arm 16 to form the one way directional control, and a central pinion or pinion portion 45 which extends axially therefrom through an opening in the front wall 13 of the motor case 12 and into the gear box 11 to drive a gear train (not shown) in the usual manner.

It should be readily realized that because of the bobbin or spool with its protrusions or abutments 24 and pivot 26 the coil 21, pole pieces 30 and 33, and core

3 member 36 can be assembled and aligned without the use of jigs. The pivot 26 in addition to assisting with alignment of the stator assembly 20 also provides the mounting means for the arm 16 of the one way directional control.

Figure 4:
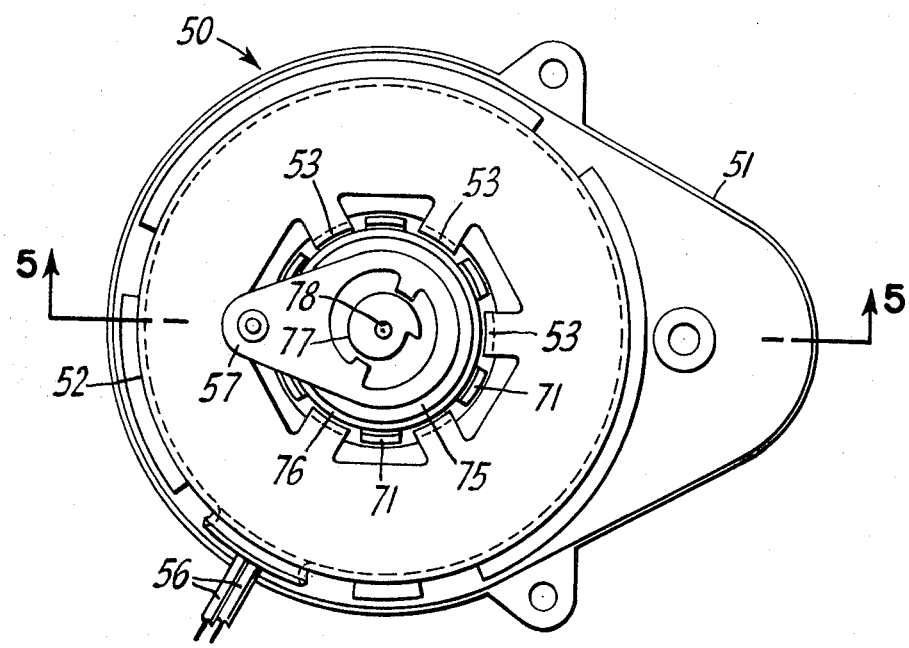
FIG. 4 is a plan view of another motor, with the cap removed, made in accordance with the present invention.
Figure 5:
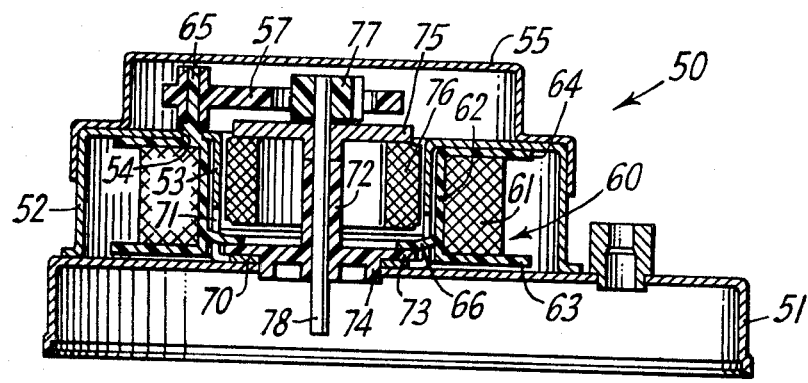
FIG. 5 is a vertical section taken on line 5—5 of FIG. 4.

Referring now to FIGS. 4 and 5, another form of motor 50 in accordance with the present invention is provided with a gear box 51 and a motor case 52 generally corresponding to the gear box 11 and motor case 12 of the motor 10. In this instance the motor case 51 forms a part of the motor stator 60 and is connected at one end to the gear box 51.

A coil 61 is wound on a bobbin or spool disposed within the case 51 and its ends are connected to the usual leads 56. The bobbin or spool is provided with a tubular body 62 and a pair of spaced flanges 63 and 64 each extending radially outwardly from different ends of the body 62. The flange 63 is disposed adjacent the gear box 51 while the flange 64 is provided with an integral pivot 65 which extends through an opening 54 in the case 52 in a direction away from the gear box 51. The pivot 65 mounts the oscillating arm 57 of a one way directional control and also prevents relative rotation between the bobbin or spool and case 52.

Figure 6:
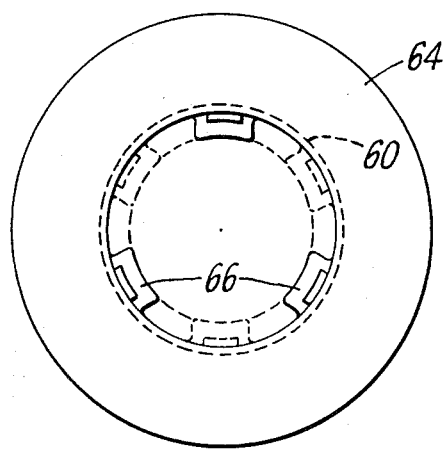
FIG. 6 is a plan view of the bobbin or spool of the motor of FIG. 5.

The end of the case 52 with the opening 54 is provided with a series of salient stator poles 53 which extend axially within the tubular bobbin body 62 toward the gear box 51. The end of the tubular bobbin body 62 adjacent to the gear box 51 is provided with a plurality equally spaced slotted tabs 66 (see also FIG. 6) which extend radially inwardly. It should be readily seen that the tabs 66 could be an annular flange with equally spaced slots, as indicated.

An elongated tubular bearing 72 is disposed axially in the motor 50 and is provided with a flange portion 73 at one end which engages the tabs 66 and a hub portion 74 which extends from the flange portion 73 through an opening in the gear box 51. A second pole piece 70 is mounted on the hub 74 between the flange 73 and the gear box 51. The pole piece 70 is provided with a peripheral series of spaced salient stator poles 71 which extend axially within the tubular spool body 62 in a direction away from the gear box 51. The poles 71 are disposed in the spaces between the poles 53, and each extends through a slot in a different one of the tabs 66 which prevents relative rotation between the spool and pole piece 70.

The salient poles 53 and 71 alternately form an annular series of spaced salient stator poles within the tubular bobbin body 62 and encircling the permanent magnet ring 76 of a rotor 75. The rotor 75 is mounted on a shaft 78 which extends through the bearing 72 into the gear box 51. The end of the shaft 78 in the gear box 51 is adapted to receive or mount a pinion (not shown) for driving a gear train (not shown). A cam member 77 is mounted on the other end of the shaft 78 adjacent the rotor 75 and cooperates with the arm 57 to provide the one way directional control. A cap 55 is placed on the motor case 52 to enclose the rotor 75 and the directional control.

Because of the pivot 65 and the tabs 66, the bobbin or spool prevents relative movement between the motor case 52 providing one set of poles 53 and the pole piece 70. Accordingly, the stator 70 comprising the motor case 52, the coil 61 on the bobbin, the bearing 72 and the pole piece 70 can be assembled without jigs.

4

Figure 7:
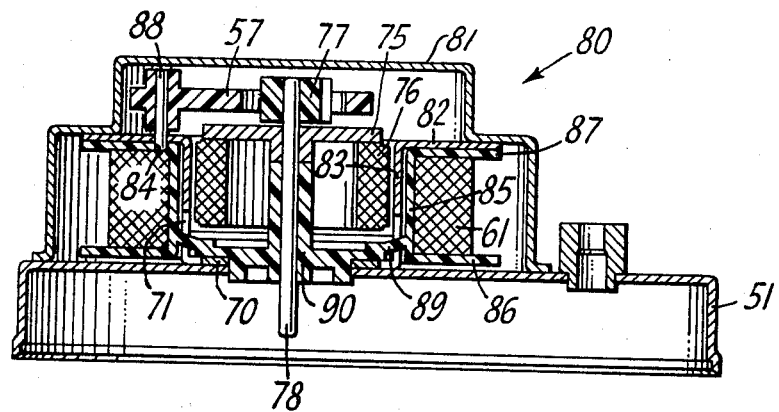
FIG. 7 is a vertical section similar to FIG. 5 and illustrating various structural modifications.

Referring now to FIG. 7, a motor 80 is similar to the motor 50 and illustrates several modifications. Motor 80 is provided with a motor case 81 which generally corresponds to case 52 and cap 55 of motor 50. A separate pole piece 82 provides salient stator poles 83 which correspond to poles 53 of motor 50.

The coil 61, in this instance, is wound on a spool or bobbin having a tubular body 85 with flanges 86 and 87 corresponding to the body 62 and flanges 63 and 64 of the motor 50. In place of the molded pivot 65, a pivot pin 88 is molded or otherwise mounted at one end on the flange 87 and extends through an opening 84 in pole piece 82 corresponding to the opening 54 of motor case 52. Finally a bearing portion 90 corresponding to bearing 72, is molded integral with the spool or bobbin. The bearing portion 90 is connected to the body portion 85 by an annular web 89 having slots corresponding to the slots of tabs 66.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

We claim:

1. A stator capable of being assembled without jigs for a synchronous motor with a permanent magnet rotor, comprising
   spool means having a tubular body portion and a pair of spaced flange portions each extending radially outwardly from a different end of said body portion,
   a wound coil on said spool means,
   a pair of pole pieces each adjacent a different one of said flange portions and having a series of spaced salient poles extending axially relative to said spool means and being disposed in the spaces between the salient poles of the other pole piece thereby forming a ring of salient stator poles disposed concentrically with respect to the permanent magnet motor, and
   a pivot extending axially from one of said flange portions and through the adjacent pole piece for mounting a cam follower arm of a directional control of the motor.

2. The stator in accordance with claim 1, and further including
   abutment means extending axially from the other one of said flange portions and,
   said pole piece adjacent said other flange portion being provided with means for engaging said abutment means.

3. The stator in accordance with claim 2, and
   said abutment means comprising at least one protrusion extending from said other flange portion, and
   said pole piece adjacent the other flange portion having a pair of spaced walls engaging opposite sides of said abutment means.

4. The stator in accordance with claim 1, and
   abutment means comprising a plurality of arcuately spaced slotted tab portions extending radially inwardly from said body portion, and
   a different one of said salient poles of the second adjacent pole piece extending through each of said slotted tab portions.

5. The stator in accordance with claim 1, and abutment means comprising an annular flange portion extending radially inwardly from said body portion and having a plurality of arcuately spaced slots, and each of said salient poles of the second adjacent pole piece extending through a different one of the slots.

6. The stator in accordance with claim 1, and said spool means including a bearing portion extending axially within said body portion, and a web portion joining said bearing and body portions to each other at one end of said spool means, said web portion having a plurality of selectively spaced slots, and each of said salient poles of the adjacent pole piece extending through a different one of the slots.

* * * * *